(12) United States Patent
Shinoda

(10) Patent No.: US 6,395,836 B1
(45) Date of Patent: May 28, 2002

(54) POLYMER USEFUL FOR COATING

(75) Inventor: Tomohiro Shinoda, Omiya (JP)

(73) Assignee: Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 09/666,419

(22) Filed: Sep. 20, 2000

(30) Foreign Application Priority Data

Sep. 27, 1999 (JP) .............................. 11-272111

(51) Int. Cl.[7] .......................... C08L 35/02; C08L 33/06; C08F 265/04
(52) U.S. Cl. ................ 525/222; 525/308; 525/330.3; 523/412; 523/201; 524/560; 524/561
(58) Field of Search ............................. 525/222, 308, 525/330.3; 523/412, 201; 524/560, 561

(56) References Cited

U.S. PATENT DOCUMENTS

| | | |
|---|---|---|
| 3,454,516 A | 7/1969 | Victorius |
| 4,097,553 A * | 6/1978 | Novak ..................... 523/201 |
| 4,150,005 A | 4/1979 | Gehman et al. |
| 5,185,387 A | 2/1993 | Klesse et al. |

FOREIGN PATENT DOCUMENTS

WO     WO 94/04581     3/1994

* cited by examiner

Primary Examiner—James J. Seidleck
Assistant Examiner—Olga Asinovsky
(74) Attorney, Agent, or Firm—Stephen T. Falk

(57) ABSTRACT

A copolymer containing at least two acrylic copolymers having a specific range of glass transition temperatures is disclosed. The copolymer provides a film having excellent physical properties. The process for forming the copolymer is also disclosed.

8 Claims, 8 Drawing Sheets

POLYMER USEFUL FOR COATING

The present invention relates to a copolymer. More particularly, the present invention relates to a film-forming copolymer having excellent physical properties and the process for forming the copolymer.

BACKGROUND OF THE INVENTION

It is often necessary to heat and dry a coated film to fully reveal the physical properties of a polymer of conventional technology. Generally, the physical properties, such as a strength and elongation, of the film dried at an elevated temperature are superior to those of the film dried at ambient temperature. A film dried at atmospheric temperature has poorer water resistance and blister resistance, especially after long term exposure under humid conditions than a comparable film dried at an elevated temperature. Furthermore, some conventional polymers show poorer film forming ability at low temperature than a comparable film dried at an elevated temperature and are unusable in certain applications. As used herein, the term "ambient temperature" usually means a temperature above 0° C. and, more specifically, from 5° C. to 35° C.

The object of the present invention is to provide a copolymer that can provide a film having excellent physical properties even when coated and dried at a low temperature. The film prepared from the coating compositions containing the copolymer of the present invention have excellent physical properties, such as a strength and elongation, as well as an excellent water resistance, weather resistance and thermal stability.

The inventor of the present invention has found that the above problem can be solved by using a copolymer prepared by a multi-step polymerization process and which contains at least two acrylic copolymer portions each having a specific range of glass transition temperatures.

SUMMARY OR THE INVENTION

The present invention relates to a core/shell copolymer, comprising:
 (a) an acrylic copolymer portion A having a Tg of from 30° C. to 70° C., preferably 30° C. to 60° C.; and
 (b) an acrylic copolymer portion B having a Tg of from 5° C. to −30° C., preferably 5° C. to −20° C.;
  wherein said acrylic copolymer portion A is present at a level of from 5 weight % to 40 weight %, based on a total weight of said acrylic copolymer portions A and B;
  wherein said acrylic copolymer portion B is present at a level of from 60 weight % to 95 weight %, based on a total weight of said acrylic copolymer portion A and B;
  wherein said acrylic copolymer portions A and B contain units derived from same said hard monomer and same said soft monomer,
  wherein the total amount of said units derived from said hard monomer and soft monomer in each of said acrylic copolymer portion is at least 70 weight %, based on the weight of each acrylic copolymer portion; and
  wherein said core/shell copolymer is prepared by a multi-step polymerization process.

The present invention further relates to a process for preparing a core/shell copolymer, comprising the steps of:
 (1) preparing an acrylic copolymer portion B having a Tg of from 5° C. to −30° C. from a monomer mixture (b); and
 (2) preparing an acrylic copolymer portion A having a Tg of from 30° C. to 70° C. from a monomer mixture (a) in the presence of said acrylic copolymer portion B;
  wherein monomer mixture (a) is present at a level of from 5 to 40 weight % based on a total weight of the monomer mixtures (a) and (b);
  wherein monomer mixture (b) is present at a level of from 60 to 95 weight %, based on a total weight of the monomer mixtures (a) and (b);
  wherein said monomer mixtures (a) and (b) contain the same hard monomer and the same soft monomer; and
  wherein the total amount of said hard monomer and said soft monomer in each mixtures (a) and (b) is at least 70 weight %, based on the weight of the mixture.

DETAILED DESCRIPTION OF THE INVENTION

Figure 1:
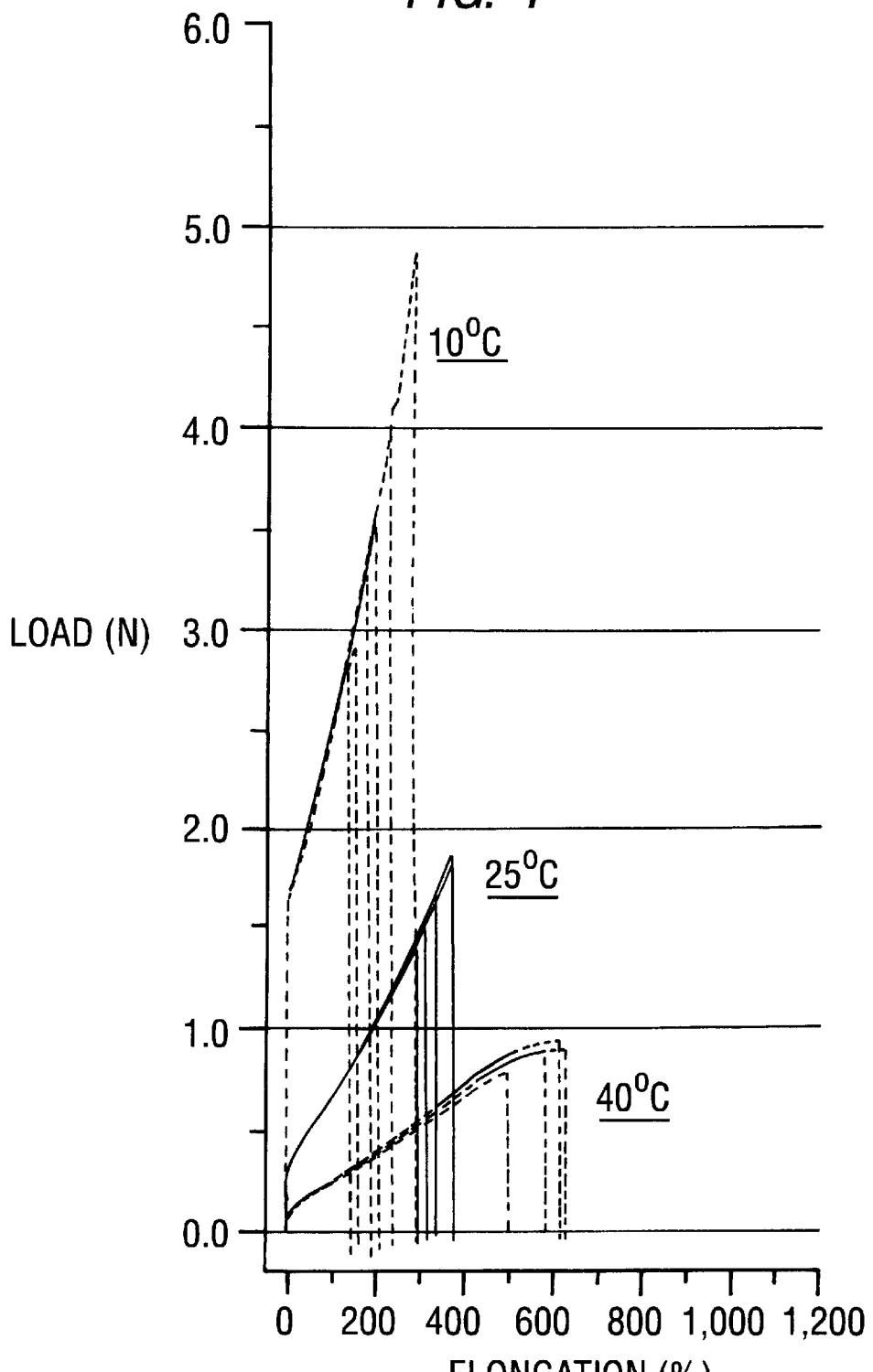
FIG. 1 shows the result of the tensile test with respect to the film formed from the composition of the experimental example 5.

In the present specification, the term "hard monomer" means a monomer whose homopolymer has a Tg of at least 50° C. and the term "soft monomer" means a monomer whose homopolymer has a Tg of below −10° C. The terms "a unit derived from hard monomer" and "a unit derived from soft monomer" mean the monomer units in the copolymer, which are derived from the hard monomer and soft monomer, respectively. The term "monomeric unit" means the maximum structural unit formed from a monomer molecule by polymerization. The term "an acrylic copolymer portion" means a copolymer portion prepared predominantly (at least 50 weight %, based on the total weight of the copolymer) from acrylates and/or methacrylates.

A "glass transition temperature" or "Tg" is a narrow range of temperature over which amorphous polymers change from a relatively hard, brittle glass state to a relatively soft viscous rubbery state. The Tg referred in the present specification is a calculated Tg. The Tg of a copolymer may be calculated by way of the following Fox equation [*Bulletin of American Physical Society*, 1,3, page 123 (1956)]:

$$1/Tg = W_1/Tg_{(1)} + W_2/Tg_{(2)}$$

wherein $W_1$ and $W_2$ are the weight fraction of monomeric units 1 and 2, respectively; $Tg_{(1)}$ and $Tg_{(2)}$ are the Tg (in degrees Kelvin) of homopolymers of monomeric units 1 and 2, respectively.

Many experimental methods to measure Tg of homopolymers and copolymers are known. A preferable method is differential scanning calorimetry (DSC). To measure the Tg by this method, the polymer samples are dried, preheated to 120° C., rapidly cooled to −100° C., and then heated to 150° C. at a rate of 20° C./minute while data is being collected. The Tg is then measured at the midpoint of the inflection using the half-height method.

The Tg of various homopolymers may be found, for example, in "Polymer Handbook," edited by J. Brandrup and E. H. Immergit, Interscience Publishers.

In the present specification, the term "copolymer portion" means the portion in a molecule, in which used monomeric units and a ratio of monomeric units are considered to be the same. In other words, a portion in a molecule, which is considered to be polymerized from a monomer mixture, is a copolymer portion. For example, when a copolymer contains a portion A in which a monomeric unit (a) and a monomeric unit (b) are present at a certain ratio, and a portion B in which monomeric unit (c) and monomeric unit (d) are present at a certain ratio, the copolymer portion A and B are considered to be different copolymers. Furthermore, when a copolymer contains a portion A in which a monomeric unit (a) and a monomeric unit (b) are present at a ratio of 10:1, and a portion B in which a monomeric unit (a) and a monomeric unit (b) are present at the ratio of 1:10, the portions A and B are considered to be different copolymer portions.

The copolymer used of the present invention is prepared by a multi-step polymerization process. The multi-step polymerization process comprises plural polymerization steps and is explained in detail hereafter. When the copolymer of the present invention is prepared by a multi-step polymerization process, it is considered that at least a portion of the first acrylic copolymer and the second acrylic copolymer are bonded by a covalent bond.

Two or more acrylic copolymer A and/or B may be contained in one molecule of the core/shell copolymer of the present invention. The portions A and B may be directly bonded by a covalent bond and may be bonded by a covalent bond via another organic compound residue. The core/shell copolymer of the present invention may also comprise a blend of individual acrylic copolymer A and individual acrylic copolymer B without the two individual copolymers being bonded together.

The term "core/shell copolymer" in the present specification includes core/shell polymer particles having two or more phases of various geometric structures, for example, core/shell or core/sheath particles, core/shell particles with shell phases incompletely encapsulating the core, core/shell particles with a multiplicity of cores and interpenetrating network particles. In the present specification, a core/shell copolymer wherein a number of very small domains of a certain polymer are present in the other polymer phase is referred to as a sequential polymer. In the preferred embodiment of the present invention, the copolymer is a sequential polymer.

As shown in the working examples, measurement of tangent delta by a dynamic visco-elasticity elasticity test of the film obtained from the copolymer of the present invention provides a broad single peak distribution in plot of a tangent delta vs. temperature. On the other hand, a blend composition provides an obvious double peak in said plot. It is considered that the single peak distribution in the tangent delta profile suggests a sequential structure, wherein a number of very small domains of acrylic copolymer portion A exist in a phase of acrylic copolymer portion B. It is further considered that the advantageous effects obtained by the copolymer of the present invention are due to such a special structure of the copolymer.

The monomers which may be used to prepare the acrylic copolymer portions A and B include: alkyl ester of acrylic and methacrylic acid, such as methyl (meth)acrylate, ethyl (meth)acrylate, propyl (meth)acrylate, isopropyl (meth)acrylate, n-butyl (meth)acrylate, iso-butyl (meth)acrylate, sec-butyl (meth)acrylate, t-butyl (meth)acrylate, pentyl (meth)acrylate, isopentyl (meth)acrylate, hexyl (meth)acrylate, 2-ethylhexyl (meth)acrylate, octyl (meth)acrylate, 3,5,5-trimethylhexyl (meth)acrylate, decyl (meth)acrylate, dodecyl (meth)acrylate, cetyl (meth)acrylate, octadecyl (meth)acrylate, octadecenyl (meth)acrylate and cyclohexyl (meth)acrylate; hydroxyester of acrylic and methacrylic acid, such as hydroxyethyl (meth)acrylate and hydroxypropyl (meth)acrylate. In the present specification, the term "(meth)acrylate" means acrylate and/or methacrylate.

An acid functional monomer, such as, acrylic acid, methacrylic acid, crotonic acid, itaconic acid, fumaric acid and maleic acid, monomethyl itaconate, monomethyl fumarate, monobutyl fumarate, maleic anhydride; other vinylmonomer such as acrylamide or substituted acrylamides; sodium vinyl sulfonate; phosphoethyl (meth)acrylate; acrylamido propane sulfonate; diacetone acrylamide; glycidyl methacrylate; acetoacetylethyl methacrylate; acrolein and methacrolein; dicyclopentadienyl methacrylate; dimethyl meta-isopropenyl benzyl isocyanate; isocyanato ethylmethacrylate; styrene or substituted styrenes; butadiene; ethylene; vinyl acetate or other vinyl esters, N-vinyl pyrrolidone; amino monomers, such as, for example, N,N'-dimethylamino and (meth)acrylate may be used. Furthermore, a minor amount of multi-functional unsaturated monomer, such as ethyleneglycol dimethacrylate, diethyleneglycol dimethacrylate, divinyl benzene and trimethylolpropane trimethacrylate may be used.

In the present invention, both acrylic copolymer portions A and B contain the units derived from same hard monomer and same soft monomer. The above means that the acrylic portion A contains the units derived from a hard monomer and a soft monomer and the acrylic portion B also contains the units derived from the same hard monomer and the same soft monomer as those used in the portion A. In the copolymer of the present invention, an amount of the acrylic copolymer portion A is from 5 weight % to 40 weight %, preferably from 10 weight % to 40 weight %, more preferably from 20 weight % to 40 weight % based on a total weight of the portions A and B and an amount of the acrylic copolymer portion B is from 60 weight % to 95 weight %, preferably from 60 weight % to 90 weight %, more preferably from 60 weight % to 80 weight %, based on a total weight of the portions A and B.

The Tg of the hard monomer is preferably from 50° C. to 110° C., more preferably from 60° C. to 110° C., most preferably from 70° C. to 110° C. The Tg of the soft monomer is preferably from −10° C. to −90° C., more preferably from −20° C. to −90° C., most preferably from −30° C. to −90° C.

In the preferred embodiment of the present invention, an acrylic copolymer portion A is present at a level of from 20 weight % to 40 weight % on the basis of a total weight of the portions A and B and comprises a monomeric unit of the monomer whose homopolymer has a Tg of from 70° C. to 110° C. and a monomeric unit of the monomer whose homopolymer has a Tg of from −30° C. to −90° C., and an acrylic copolymer portion B is present at a level of from 60 weight % to 80 weight % on the basis of a total weight of the portions A and B and comprises a monomeric unit of the monomer of which homopolymer has a Tg of from 70° C. to 110° C. and a monomeric unit of the monomer of which homopolymer has a Tg of from −30° C. to −90° C.

In the preferred embodiment of the present invention, a total amount of the units derived from said hard monomer and soft monomer in each copolymer portion A and B is above 80 weight %, more preferably above 90 weight %, based on the weight of each respective portion.

Preferable hard monomers include, for example, methyl methacrylate, ethyl methacrylate, iso-butyl methacrylate, hydroxyethyl methacrylate, hydroxypropyl methacrylate and styrene. Preferable soft monomers include, for example, ethyl acrylate, n-butyl acrylate, s-butyl acrylate, 2-ethylhexyl acrylate and hydroxyethyl acrylate.

If used, an acid-functional vinyl monomer is used preferably from 0.3 weight % to 2.0 weight %, more preferably from 0.3 weight % to 1.0 weight %, based on the total amount of monomers in the portion. Preferable acid-functional vinyl monomers are acrylic acid and methacrylic acid.

In the most preferred embodiment, methyl methacrylate is used as the hard monomer, butyl acrylate is used as the soft monomer and acrylic acid is used as an acid-functional vinyl monomer.

Preferably, the copolymer of the present invention has a molecular weight above 20,000, more preferably from 50,000 to 1,000,000, most preferably, from 50,000 to 600,000.

"GPC weight average molecular weight" means the weight average molecular weight determined by gel permeation chromatography (GPC) which is described on page 4, Chapter I of the *Characterization of Polymers* published by Rohm and Haas Company, Philadelphia, Pa. in 1976. Polystyrene is used as the molecular weight standard.

Since both acrylic copolymer portions A and B are contained in a single molecule when covalently bonded, it is difficult to determine the molecular weights thereof by experiment. However, the GPC weight average molecular weight can be estimated by calculating a theoretical weight average molecular weight. In systems containing chain transfer agents, the theoretical weight average molecular weight is simply the total weight of polymerizable monomer in grams divided by the total molar amount of a chain transfer agent used during polymerization. Estimating the molecular weight of an emulsion polymer system that does not contain a chain transfer agent is more complex. A cruder estimate can be obtained by taking the total weight of polymerizable monomer in grams and dividing that quantity by the product of the molar amount of an initiator multiplied by an efficiency factor (in our persulfate initiated systems, I have used a factor of approximately 0.5). Further information on theoretical molecular weight calculations can be found in *Principles of Polymerization* $2^{nd}$ edition, by George Odian published by John Wiley and Sons, NY, N.Y. in 1981 and in *Emulsion Polymerization* edited by Iraja Pirma published by Academic Press, NY, N.Y. in 1982.

A molecular weight of the individual acrylic copolymer portions A and B calculated by the above method are preferably above 20,000, more preferably from 50,000 to 1,000,000, most preferably, from 50,000 to 600,000.

If present, the molecular weight of individual polymer of acrylic copolymers A and B are measured and the measured molecular weight thereof may be treated as the molecular weight of acrylic copolymer portions A and B.

In the film obtained from the copolymer of the present invention, one of the acrylic copolymer portions A and B may form a continuous phase and the other may form a non-continuous phase. Both of the acrylic copolymer portions A and B may form continuous phases. The morphology of the obtained film may change depending on several factors, such as monomer compositions of the acrylic copolymer portions A and B, the ratio of the acrylic copolymer portions A and B, and film forming conditions. Preferably, the acrylic copolymer portion B forms the continuous phase and the acrylic copolymer portion A forms the non-continuous phase.

The present invention further relates to a process for preparing a copolymer used in the composition of the present invention, comprising the steps of:

(1) preparing an acrylic copolymer B having a Tg of from 5° C. to −30° C. from a monomer mixture (b); and (2) preparing an acrylic copolymer A having a Tg of from 30° C. to 70° C. from a monomer mixture (a) in the presence of said first acrylic copolymer;

wherein monomer mixture (a) is present at a level of from 5 to 40 weight % based on a total weight of the monomer mixtures (a) and (b);

wherein monomer mixture (b) is present at a level of from 60 to 95 weight %, based on a total weight of the monomer mixtures (a) and (b);

wherein said monomer mixtures (a) and (b) contain the same hard monomer and the same soft monomer; and wherein the total amount of said hard monomer and said soft monomer in each mixtures (a) and (b) is at least 70 weight %, based on the weight of the mixture.

The steps of the process of the present invention may be carried out continuously. The process of the present invention can be carried out as a seed polymerization process wherein pre-formed acrylic copolymer B is used as a seed. Preferably, the steps is carried out continuously.

The core/shell copolymer of the present invention may be prepared by well known polymerization method. Preferably, the core/shell copolymer may be prepared by emulsion or solution polymerization employing free-radical initiation. Polymerization may be performed continuously or batchwise. Either thermal or redox initiation processes may be used. Preferably, the copolymer of the present invention is an aqueous copolymer prepared by an emulsion polymerization.

The polymerization process is typically initiated by conventional free radical initiators, which include hydrogen peroxide; hydroperoxides, such as, t-butyl hydroperoxide; dialkyl peroxides, such as, di-t-butyl peroxide; peroxy ester, such as t-butylperoxy pivalate; diacyl peroxides, such as, benzoyl peroxide; azo compounds, such as, 2-2'-azobisisobutyronitrile; and, ammonium and alkali persulfates, such as, sodium persulfate, typically at a level of 0.05% to 3.0% by weight, based on the total weight of the monomer mixture. Redox systems using the same initiators coupled with a suitable reductant such as, for example, sodium bisulfite, sodium hydrosulfite, sodium formaldehyde sulfoxylate and ascorbic acid, may be used at similar levels.

Chain transfer agents may be used in an amount effective to provide the desired GPC weight average molecular weight. For the purpose of regulating a molecular weight of the copolymer being formed, suitable chain transfer agents include well known halo-organic compounds, such as, carbon tetrabromide and dibromodichloromethane; sulfur-containing compounds, such as, alkylthiols including ethanethiol, butanethiol, tert-butyl and ethyl mercaptoacetate, as well as aromatic thiols; or various other organic compounds having hydrogen atoms which are readily abstracted by free radicals during polymerization. Additional suitable chain transfer agents or ingredients include, but are not limited, to butyl mercaptopropionate; isooctylmercapto propionate; bromoform; bromotrichloromethane; carbon tetrachloride; alkyl mercaptans, such as, 1-dodecanthiol, tertiary-dodecyl mercaptan, octyl mercaptan, tetradecyl mercaptan, and hexadecyl mercaptan; alkyl thioglycolates, such as, butyl thioglycolate, isooctyl thioglycoate, and dodecyl thioglycolate; thioesters; or combinations thereof. Mercaptans are preferred.

When the copolymer in the form of a dispersed polymer is utilized, the particle size of the copolymer is controlled by the amount of conventional surfactants added during the emulsion polymerization process. Conventional surfactants include anionic, nonionic emulsifiers or their combination. Typical anionic emulsifiers include the salts of fatty rosin and naphthenic acids, condensation products of naphthalene sulfonic acid and formaldehyde of low molecular weight, carboxylic polymers and copolymers of the appropriate hydrophile-lipophile balance, alkali or ammonium alkyl sulfates, alkyl sulfonic acids, alkyl phosphonic acids, fatty acids, and oxyethylated alkyl phenol sulfates and phosphates. Typical nonionic emulsifiers include alkylphenol ethoxylates, polyoxyethylenated alkyl alcohols, amine polyglycol condensates, modified polyethoxy adducts, long chain carboxylic acid esters, modified terminated alkylaryl ether, and alkylpolyether alcohols. Typical ranges for surfactants are between 0.1% to 6% by weight, based on the total weight of the monomer mixture.

When the core/shell copolymer in the form of a dispersed polymer is utilized, the particle size of the copolymer is preferably from 50 nm to 200 nm, more preferably from 50 nm to 150 nm, most preferably from 50 to 120 nm. "Polymer particle size" means the diameter of the polymer particles measured by using a Brookhaven Model BI-90 Particle Sizer supplied by Brookhaven Instruments Corporation, Holtsville, N.Y., which employs a quasi-elastic light scattering technique to measure the size of the polymer particles. The intensity of the scattering is a function of particle size. The strength of scattering is a function of the particle size. The diameter based on an intensity weighted average is used. This technique is described in Chapter 3, pages 48–61, entitled "Uses and Abuses of Photon Correlation Spectroscopy in Particle Sizing" by Weiner et al. in 1987 edition of *American Chemical Society Symposium* series.

The copolymer of the present invention is preferably used in an aqueous coating composition. The aqueous coating composition comprising the copolymer of the present invention can be applied on many kinds of substrate, such as metal, wood, glass, plastic, rubber, paper and textile.

If desired and depending on the intended use of the coating composition, additional components may be added to the composition. These additional components includes but are not limited to plasticizers, coalescents, pigments, dyes, extenders, defoamers, wetting agents, dispersing agents, thickeners, pH controllers, preservatives, antifreezing agents, drying improvers, waxes, UV absorber, photo-stabilizer, slip additives and crosslinking agents. The coalescents, as used herein are those film forming agents that evaporate from an applied layer, substantially after the evaporation of the volatile water soluble organic solvent and water present in the applied layer.

The coating composition comprising the copolymer of the present invention may optionally comprise water miscible, or water dilutable solvent. Generally, the coating composition comprising the copolymer of the present invention has a solid content of from 40 weight % to 50 weight %, based on the total weight of the composition. A solid content can be controlled depending on a coating apparatus, coating condition and the intended use of the coating composition. The coating composition comprising the copolymer of the present invention may be applied by a conventional coating method, for example, spray coating, roller coating, and brush coating. A coating composition may be used after dilution with a solvent such as water or water miscible solvent depending on the coating apparatus and coating conditions. The coating conditions and coating temperature may be readily adjusted by those skilled in the art.

The coating composition comprising the core/shell copolymer of the present invention has excellent physical properties. In particular, the coating has excellent water resistance, weather resistance and thermal stability and retains excellent physical properties over a long term storage.

The present invention will now be described in detail with examples. However, the present invention is not limited by such examples.

EXPERIMENTAL EXAMPLE 1

Preparation of a Monomer Mixture for the First Step Polymerization

An emulsified monomer mixture was prepared by dissolving a UV absorber in methylmethacrylate, adding deionized water and 25% solution of HS-10 (nonylpropenyl phenylethoxy ether sulfate ammonium), mixing to emulsify the mixture and gradually adding the remaining monomers.

Preparation of a Monomer Mixture for the Second Step Polymerization

An emulsified monomer mixture was prepared by adding 25% solution of HS-10 to deionized water and gradually adding the remaining monomers with stirring to prepare an emulsified monomer mixture.

Preparation of Emulsion Polymer

To a reaction vessel with thermometer, condenser and stirrer, 34.0 g of 25% solution of HS-10, 1048.7 g of deionized water were added and heated to 80–85° C. A solution of 5.8 g of sodium carbonate in 33.0 g of deionized water was added into the reaction vessel, after that a solution of 6.1 g of sodium persulfate in 26.7 g of deionized water was added. After about 2 minutes, the monomer mixture for the first step was gradually added. The addition rate was controlled so as to enable to remove an exothermic heat of polymerization with cooling. An addition time was from about 90 to 150 minutes. A polymerization temperature was kept from 80° C. to 90° C. using cooling, if necessary. After completion of the addition, a container of monomer mixture and a feed line were rinsed with 31.6 g of deionized water and the rinse was added to the reaction vessel. After that, a polymerization temperature was kept from 80° C. to 90° C. for 30 minutes. Next, a solution of 1.2 g of sodium persulfate in 6.5 g of deionized water was added. After that the second monomer mixture was gradually added. The addition rate was controlled so as to be able to remove an exothermal heat of polymerization with cooling. An addition time was from about 30 to 90 minutes. A polymerization temperature was kept from 80° C. to 90° C. using cooling, if necessary. After completion of the addition, a container of monomer mixture and a feed line were rinsed with 21.0 g of deionized water and the rinse was added to the reaction vessel. The produced polymer was cooled to room temperature and provided emulsion polymers 1–7. The monomer composition of the first and second steps, calculated Tg, and the weight ratio of the monomers in the first step and the second step are represented in Table 1. In Table 1, BA is butyl acrylate, 2-EHA is 2-ethylhexyl acrylate, MMA is methyl methacrylate, RUVA93 is reactive UV adsorbing agent, Sty is styrene and AA is acrylic acid.

AC-33: Primal AC33 Acrylic emulsion having a Tg of 5° C., and a solid content of 48.0%, supplied by Rohm and Haas Company AC-264: Primal AC264 Acrylic emulsion having Tg of 15° C., and a solid content of 60.5%, supplied by Rohm and Haas Company Measurement of Physical Property The coating composition No. 5 prepared in the above was coated at 50 microns of dry thickness and dried under the following three conditions; at 25° C. for 10 minutes and at 70° C. for 15 minutes; at 25° C. for 10 minutes and at 50° C. for 15 minutes; and at room temperature. The obtained film was cut into a sample piece and tensile test and dynamic

TABLE 1

|  | Example 1 | | Example 2 | | Example 3 | | Example 4 | | Example 5 | | Example 6 | | Example 7 | |
| --- | --- | --- | --- | --- | --- | --- | --- | --- | --- | --- | --- | --- | --- | --- |
|  | 1st Step | 2nd Step | 1st Step | 2nd Step | 1st Step | 2nd Step | 1st Step | 2nd Step | 1st Step | 2nd Step | 1st Step | 2nd Step | 1st Step | 2nd Step |
| Deionized Water | 330.6 | 220.4 | 385.7 | 165.3 | 330.6 | 220.4 | 330.6 | 220.4 | 385.7 | 165.3 | 330.6 | 220.4 | 385.7 | 165.3 |
| HS-10 (25%) | 102.3 | 68.2 | 119.4 | 51.2 | 102.3 | 68.2 | 102.3 | 68.2 | 119.4 | 51.2 | 102.3 | 68.2 | 119.4 | 51.2 |
| BA | 598.5 | 214.8 | 701.8 | 161.1 | 601.6 | 214.9 | 642.5 | 214.9 | 749.6 | 161.1 | 642.5 | 173.9 | 749.6 | 130.4 |
| 2-EHA |  |  |  |  |  |  | 10.2 |  | 11.9 |  | 10.2 |  | 11.9 |  |
| MMA | 402.5 | 463.8 | 469.0 | 347.9 | 405.2 | 259.2 | 358.1 | 463.8 | 417.8 | 347.9 | 358.0 | 504.8 | 417.8 | 378.6 |
| RUVA93 | 17.0 |  | 8.4 |  | 11.2 |  | 7.2 |  | 8.4 |  | 7.2 |  | 8.4 |  |
| Sty |  |  |  |  |  | 204.6 |  |  |  |  |  |  |  |  |
| AA (80%) | 6.4 | 4.3 | 7.5 | 3.2 | 6.4 | 4.3 | 6.4 | 4.3 | 7.5 | 3.2 | 6.4 | 4.3 | 7.5 | 3.2 |
| Calculated Tg | −10 | 35 | −10 | 35 | −10 | 34 | −16 | 35 | −17 | 35 | −16 | 46 | −16 | 46 |
| Weight Ratio of Monomer | 6 | 4 | 7 | 3 | 6 | 4 | 6 | 4 | 7 | 3 | 6 | 4 | 7 | 3 |

From the obtained emulsion polymers 1–7, the coating samples were prepared in accordance with the following formulations and the coating compositions 1–7 were obtained. The comparative samples were prepared from commercially available acrylic emulsions. They were evaluated.

visco-elasticity test were carried out. The tensile test was carried out at 10° C., 25° C. and 40° C.

A result of the tensile test is shown in the FIGS. 1–6. A result of the dynamic visco-elasticity test is shown in the FIGS. 7 and 8.

TABLE 2

|  | Experimental Examples 1–7 | Comp. Ex. 1 JP202:JP203 (7:3) | Comparative Example 2 B-15 | Comparative Example 3 AC-33 | Comparative Example 4 AC-264 |
| --- | --- | --- | --- | --- | --- |
| Emulsion | 95 | 95 | 100 | 96 | 74 |
| Water | 5 | 5 | — | 4 | 26 |
| TT-935 thickener | 0.1 | 0.1 | — | 0.1 | 0.1 |
| 5% NaOH | 1.0 | 1.0 | — | — | — |
| 28% NH4OH | 0.5 | 0.5 | 0.2 | — | — |
| Foamaster AP defoamer | 0.4 | 0.4 | 0.4 | 0.4 | 0.4 |

TT-935 is a thickener supplied by Rohm and Haas Company. Formaster AP is a defoamer supplied by San Nopco.

Figure 2:
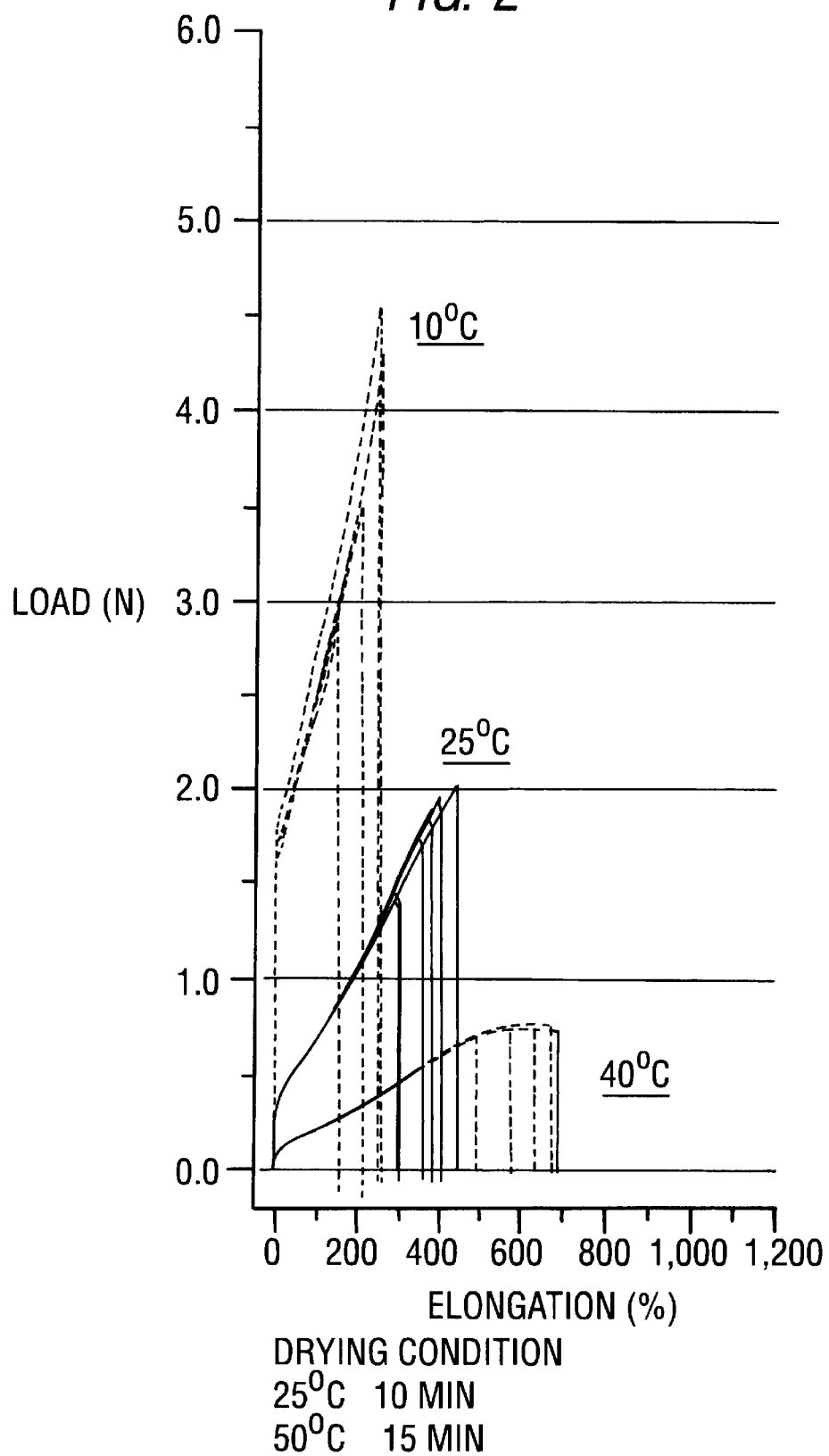
FIG. 2 shows the result of the tensile test with respect to the film formed from the composition of the experimental example 5.
Figure 3:
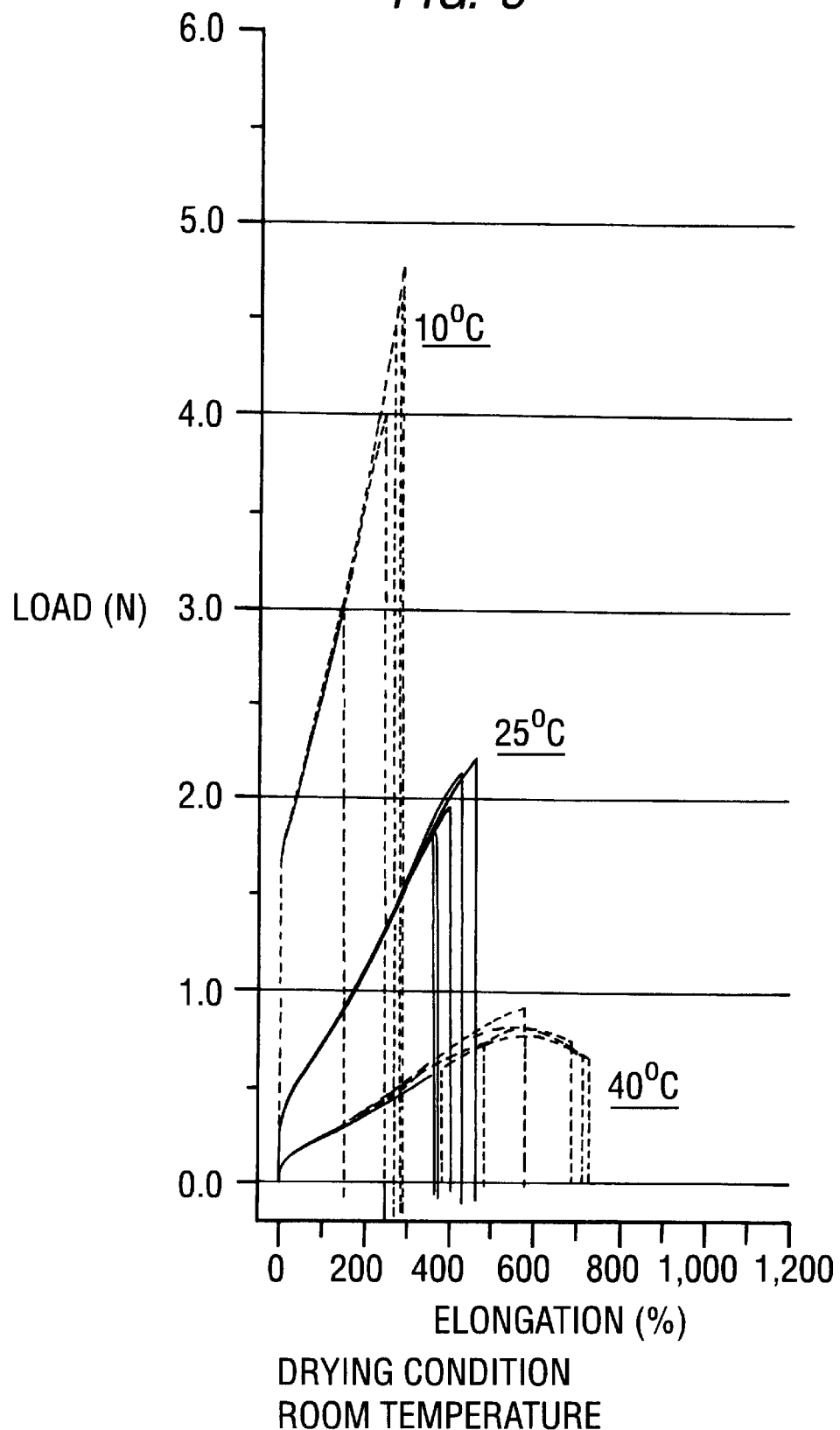
FIG. 3 shows the result of the tensile test with respect to the film formed from the composition of the experimental example 5.
Figure 4:
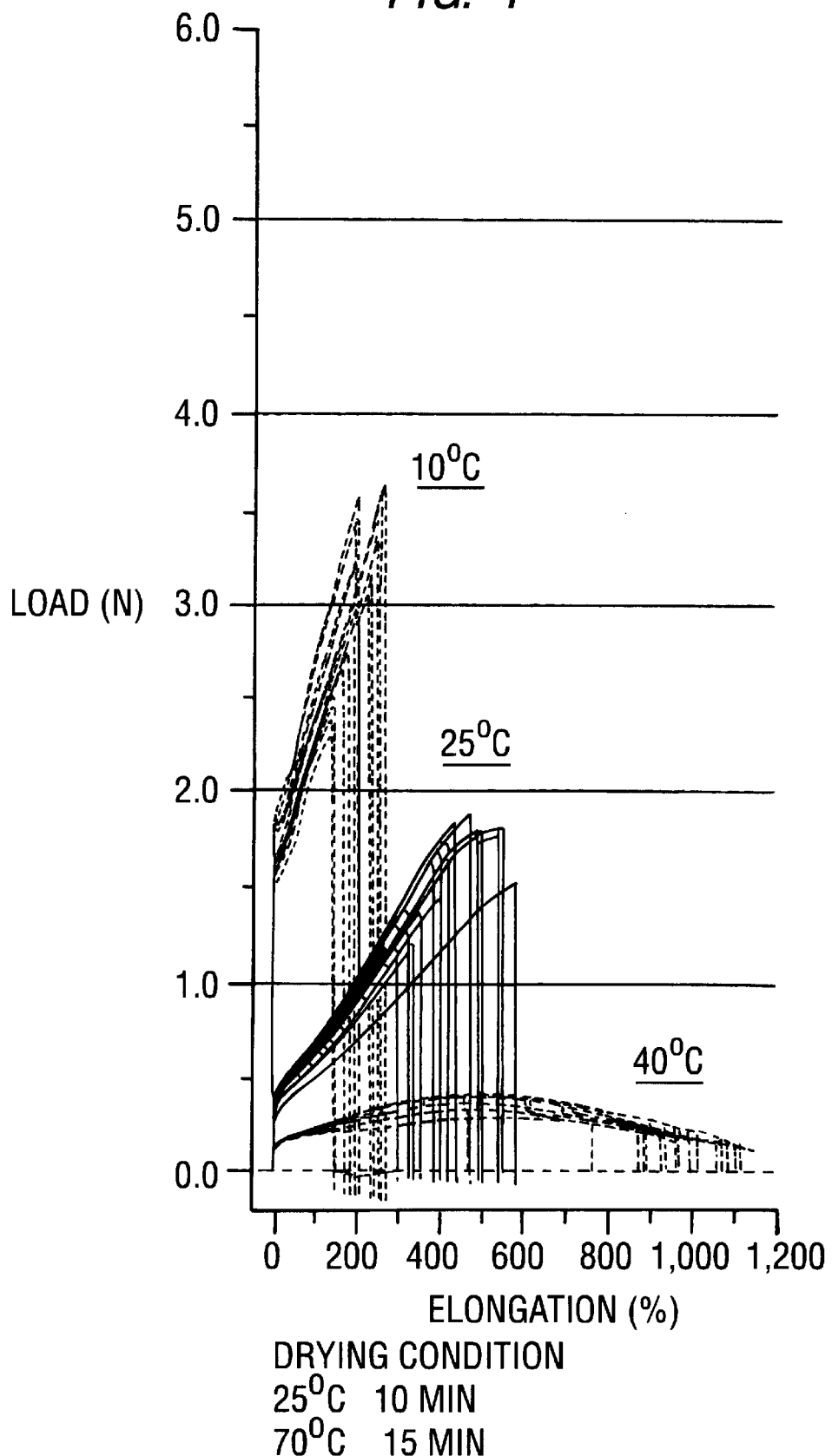
FIG. 4 shows the result of the tensile test with respect to the film formed from the composition of the comparative example 1.
Figure 5:
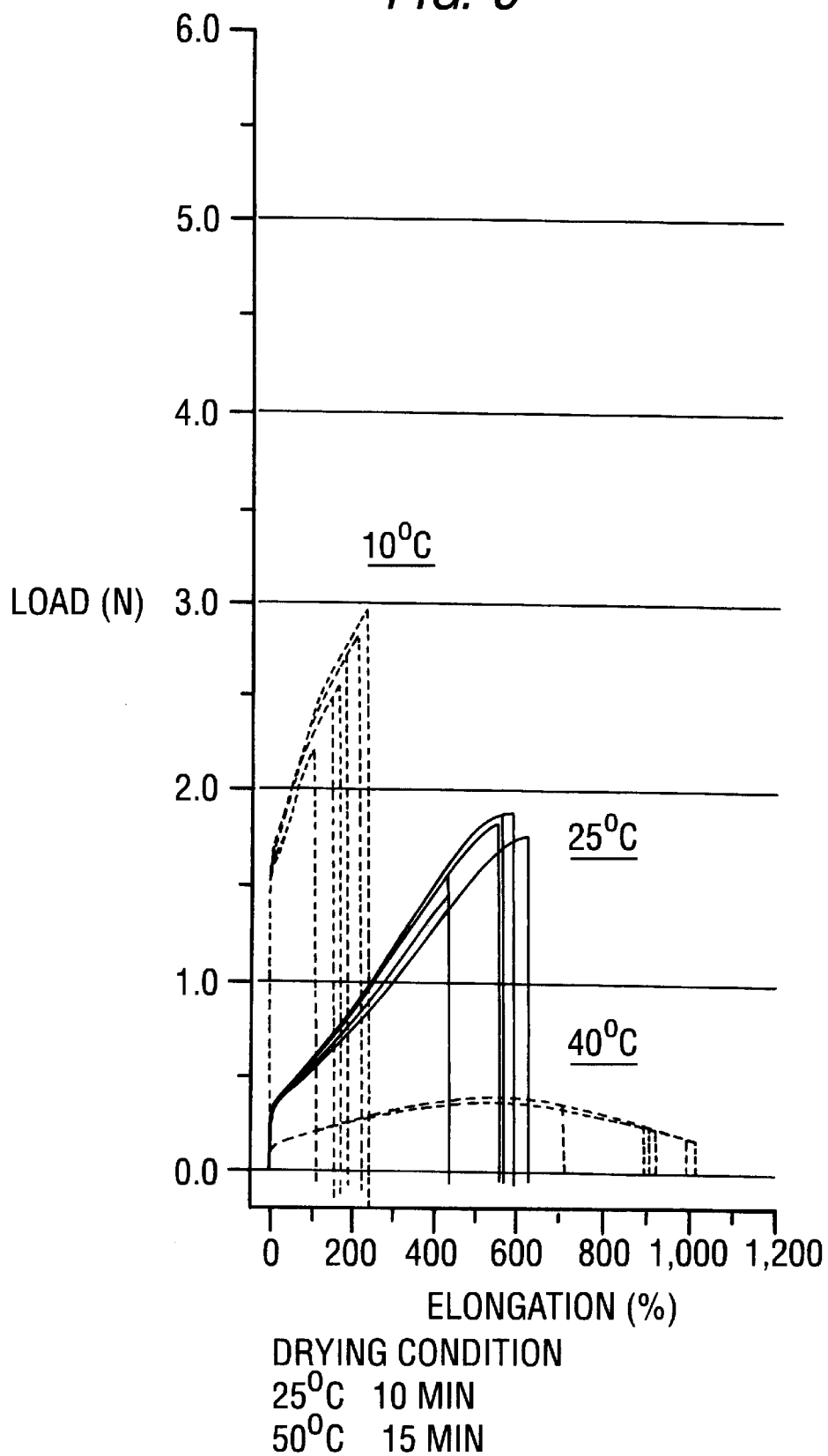
FIG. 5 shows the result of the tensile test with respect to the film formed from the composition of the comparative example 1.
Figure 6:
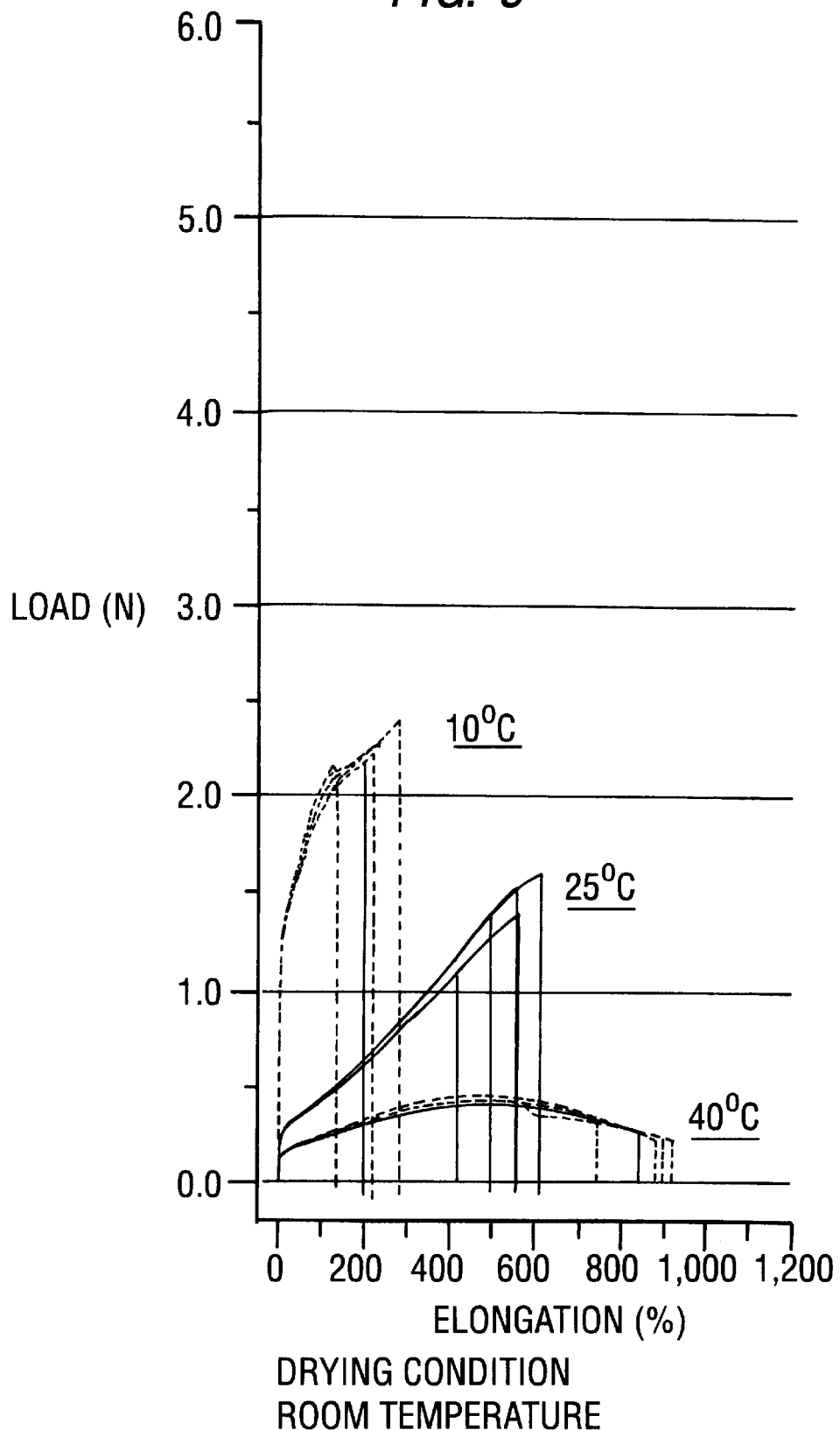
FIG. 6 shows the result of the tensile test with respect to the film formed from the composition of the comparative example 1.

The emulsion used in the comparative examples 1–4 are as follows:

JP202: PRIMAL JP-202 acrylic emulsion having a Tg of 8° C., and a solid content of 47.5%, supplied by Rohm and Haas Company JP203: PRIMAL JP-203 Acrylic emulsion having a Tg of 41° C., and a solid content of 47.5%, supplied by Rohm and Haas Company B-15: PRIMAL B-15 Acrylic emulsion having a Tg of −5° C., and a solid content of 46.0%, supplied by Rohm and Haas Company FIGS. 1–3 show a result of the tensile test with respect to the film formed from the coating composition No. 5. FIG. 1 shows a result of the tensile test carried at 10° C., 25° C. and 40° C. with respect to the film dried at 25° C. for 10 minutes and at 70° C. for 15 minutes. FIG. 2 shows a result of the tensile test carried at 10° C., 25° C. and 40° C. with respect to the film dried at 25° C. for 10 minutes and at 50° C. for 15 minutes. FIG. 3 shows a result of the tensile test carried at 10° C., 25° C. and 40° C. with respect to the film dried at room temperature. FIGS. 4–6 show a result of the tensile test with respect to the film obtained from the comparative example 1. FIG. 4 shows a result of the tensile test carried at 10° C., 25° C. and 40° C. with respect to the film dried at 25° C. for 10 minutes and at 70° C. for 15 minutes. FIG. 5 shows a result of the tensile test carried at 10° C., 25° C., and 40° C. with respect to the film dried at 25° C. for 10 minutes and at 50° C. for 15 minutes. FIG. 6 shows a result of the tensile test carried at 10° C., 25° C. and 40° C. with respect to the film dried at room temperature. The film formed from the coating composition No. 5 shows superior results at every temperature to those of the comparative example.

Figure 7:
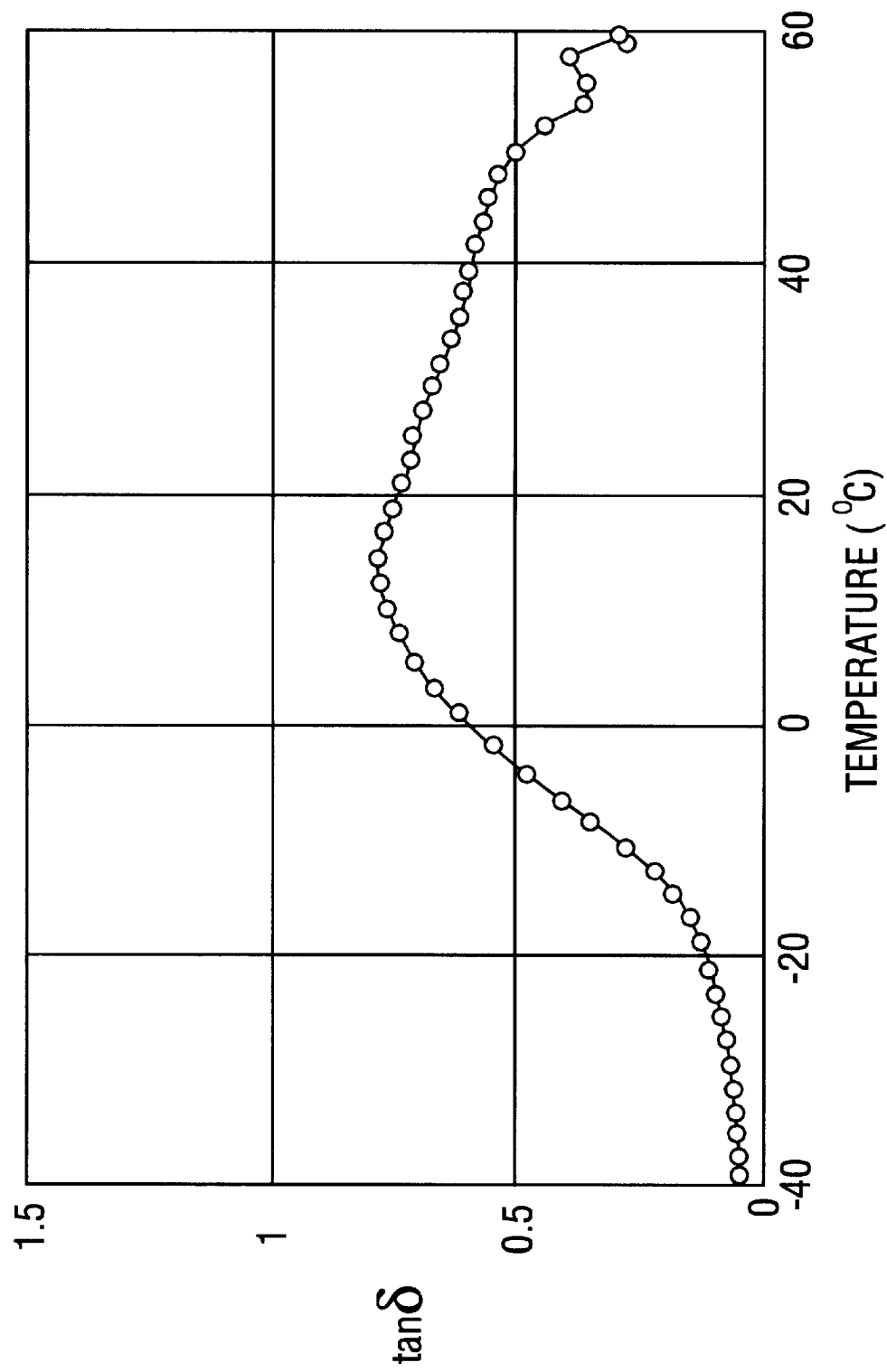
FIG. 7 shows the result of the dynamic visco-elasticity test with respect to the film formed from the composition of the experimental example 5.
Figure 8:
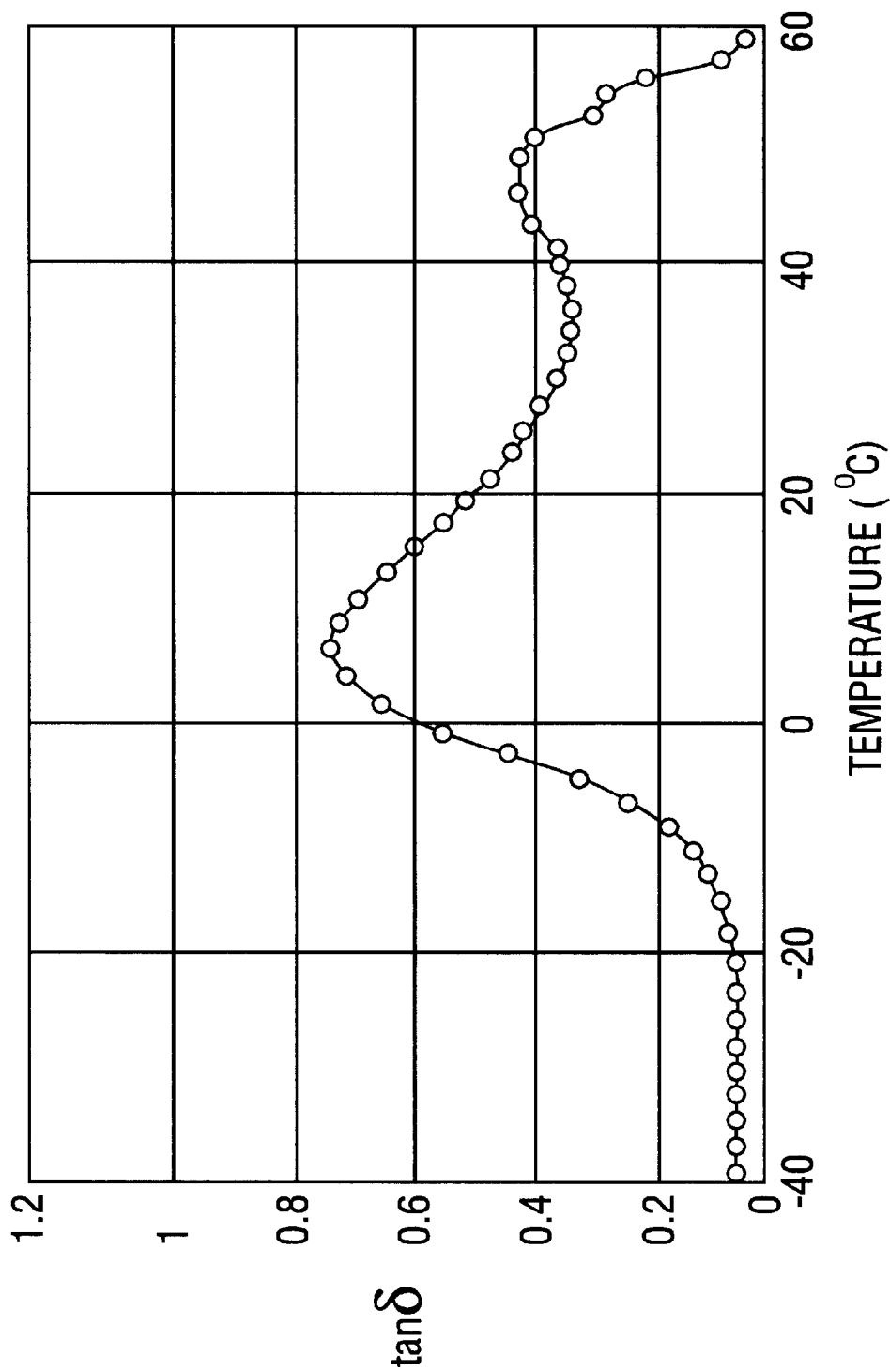
FIG. 8 shows result of the dynamic visco-elasticity test with respect to the film formed from the composition of the comparative example 1.

FIGS. 7 and 8 show a result of the dynamic viscoelasticity test with respect to the film formed from the coating composition No. 5 and coating composition of the comparative example 1, respectively. The result of the measurement of the tangent delta shows that the film formed from the comparative sample, which is a blend of two polymers, shows obvious double peak in plot of a tangent delta vs. temperature, on the other hand, the film formed from the coating composition No. 5 shows a broad single peak in plot of a tangent delta vs. temperature. It is considered that the result of the tangent delta measurement suggests a sequential structure in the film formed from the coating composition No. 5, wherein a number of very small domains of acrylic copolymer A exist in a phase of acrylic copolymer B.

The above coating compositions were coated on a glass plate or acryl-melamine coated galvanized steel at 125 microns of wet thickness. After drying for 4 hours at 25° C., all samples were dipped in water for 4 hours at 25° C. The surface of the coating was visually evaluated and recorded.

The result is shown in Table 3.

TABLE 3

|  | Experimental Example 1–7 | Comparative Example 1 | Comparative Example 2 | Comparative Example 3 | Comparative Example 4 |
| --- | --- | --- | --- | --- | --- |
| Glass Plate After dipping in water for 4 hours | No friction | No friction | Friction | Friction | Friction |
| Acrylic-Melamine Coated Galvanized Steel After dipping in water for 4 hours | No friction | No friction | Friction | Friction | Friction |

The result shows that the coating composition comprising the copolymer of the present invention provides an excellent water resistance.

What is claimed is:

1. A core/shell copolymer, comprising:
   (a) an acrylic copolymer A having a Tg of from 30° C. to 70° C. and formed from at least one hard monomer and at least one soft monomer; and
   (b) an acrylic copolymer B having a Tg of from 5° C. to −30° C. and formed from at least one hard monomer and at least one soft monomer;
      wherein said acrylic copolymer A is present at a level of from 5 to 40 weight %, based on the total weight of said first and second acrylic copolymers;
      wherein said acrylic copolymer B is present at a level of from 60 to 95 weight %, based on the total weight of said acrylic copolymers A and B;
      wherein said acrylic copolymers A and B contain units derived from same said hard monomer and same said soft monomer,
      wherein the total amount of said units derived from said hard monomer and soft monomer in each of said acrylic copolymer is at least 70 weight %, based on the weight of each acrylic copolymer;
      wherein said core/shell copolymer contains between 0.3 and 0.965 weight % of units derived from acid-functional vinyl monomers, based on the weight of said core/shell copolymer; and
      wherein said core/shell copolymer is prepared by a multi-step polymerization process.

2. The copolymer of claim 1, wherein said acrylic copolymer A and said acrylic copolymer B are bonded by a covalent bond.

3. The copolymer of claim 1 or 2, wherein said acrylic copolymer A and said acrylic copolymer B form a sequential copolymer.

4. The copolymer of claim 1, wherein the hard monomer is methyl methacrylate and the soft monomer is butyl acrylate.

5. The copolymer of claim 1, which provides a film having a single peak distribution in a plot of a tangent delta vs. temperature.

6. The film formed from the copolymer of claim 1,
      wherein said acrylic copolymer B forms a continuous phase and said acrylic copolymer A forms a non-continuous phase.

7. The film of claim 6, having a single peak distribution in a plot of a tangent delta vs. temperature.

8. A process for preparing a copolymer C, comprising the steps of.
   (1) preparing an acrylic copolymer B having a Tg of from 5° C. to −30° C. from a monomer mixture (b); and
   (2) preparing an acrylic copolymer A having a Tg of from 30° C. to 70° C. from a monomer mixture (a) in the presence of said first acrylic copolymer;
      wherein monomer mixture (a) is present at a level of from 5 to 40 weight % based on a total weight of the monomer mixtures (a) and (b);
      wherein monomer mixture (b) is present at a level of from 60 to 95 weight %, based on a total weight of the monomer mixtures (a) and (b);
      wherein said monomer mixtures (a) and (b) contain the same hard monomer and the same soft monomer;
      wherein said copolymer C contains between 0.3 and 0.965 weight % of units derived from acid-functional vinyl monomers, based on the weight of said core/shell copolymer; and
      wherein the total amount of said hard monomer and said soft monomer in each mixtures (a) and (b) is at least 70 weight %, based on the weight of the mixture.

* * * * *